United States Patent
Yamada et al.

(10) Patent No.: US 7,208,203 B2
(45) Date of Patent: *Apr. 24, 2007

(54) METHOD FOR FORMING METAL OXIDE FILM AND METHOD FOR FORMING SECONDARY ELECTRON EMISSION FILM IN GAS DISCHARGE TUBE

(75) Inventors: Hitoshi Yamada, Kawasaki (JP); Akira Tokai, Kawasaki (JP); Manabu Ishimoto, Kawasaki (JP); Akira Nakazawa, Kawasaki (JP); Kenji Awamoto, Kawasaki (JP); Tsutae Shinoda, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 605 days.

This patent is subject to a terminal disclaimer.

(21) Appl. No.: 10/642,271

(22) Filed: Aug. 18, 2003

(65) Prior Publication Data

US 2004/0033319 A1 Feb. 19, 2004

(30) Foreign Application Priority Data

Aug. 19, 2002 (JP) ............................ 2002-238403

(51) Int. Cl.
*B05D 7/22* (2006.01)
*B05D 3/06* (2006.01)
*B05D 3/02* (2006.01)
*B05D 3/10* (2006.01)
*B05D 5/12* (2006.01)

(52) U.S. Cl. ..................... 427/553; 427/558; 427/559; 427/230; 427/226; 427/337; 427/377

(58) Field of Classification Search ...................... None
See application file for complete search history.

(56) References Cited

U.S. PATENT DOCUMENTS

| 3,809,944 | A | * | 5/1974 | Jongerius et al. | ............ 313/485 |
| 4,544,997 | A | * | 10/1985 | Seuter et al. | ............... 362/263 |
| 4,911,953 | A | * | 3/1990 | Hosonuma et al. | ......... 427/224 |
| 4,988,661 | A | * | 1/1991 | Arai et al. | .................. 502/327 |
| 5,260,241 | A | * | 11/1993 | Addiego et al. | .............. 502/60 |
| 5,935,638 | A | * | 8/1999 | Chandra et al. | .............. 427/58 |
| 5,962,079 | A | * | 10/1999 | Koberstein et al. | ......... 427/508 |

(Continued)

FOREIGN PATENT DOCUMENTS

EP 1 108 468 6/2001

(Continued)

OTHER PUBLICATIONS

"Laser Micro-Fabrication of Waveguide Devices", IBM Technical Disclosure Bulletin, vol. 31, #11, Apr. 1, 1989, pp. 150-152.*

*Primary Examiner*—Marianne Padgett
(74) *Attorney, Agent, or Firm*—Westerman, Hattori, Daniels & Adrian, LLP.

(57) ABSTRACT

According to the present invention, there is provided a method for forming a metal oxide film comprising, when a metal oxide film is formed by conducting a thermal treatment on a coating film containing an organic metal compound formed on an inner wall of a tube, performing an ultraviolet irradiation treatment or an ozone treatment on the coating film prior to or simultaneously with the thermal treatment.

5 Claims, 5 Drawing Sheets

U.S. PATENT DOCUMENTS

| | | | |
|---|---|---|---|
| 5,995,696 A * | 11/1999 | Miyagi et al. | 385/125 |
| 6,337,032 B1 * | 1/2002 | Chivukula et al. | 252/62.9 R |
| 6,376,691 B1 * | 4/2002 | Celinska et al. | 556/28 |
| 6,399,145 B1 * | 6/2002 | Jerebic et al. | 427/106 |
| 6,576,302 B1 * | 6/2003 | Yamaguchi et al. | 427/597 |
| 6,893,677 B2 * | 5/2005 | Yamada et al. | 427/238 |
| 6,932,664 B2 * | 8/2005 | Yamada et al. | 445/24 |

FOREIGN PATENT DOCUMENTS

| | | | | |
|---|---|---|---|---|
| JP | 59-13605 | * | 1/1984 | 427/553 |
| JP | 7-89720 | * | 4/1995 | |

* cited by examiner

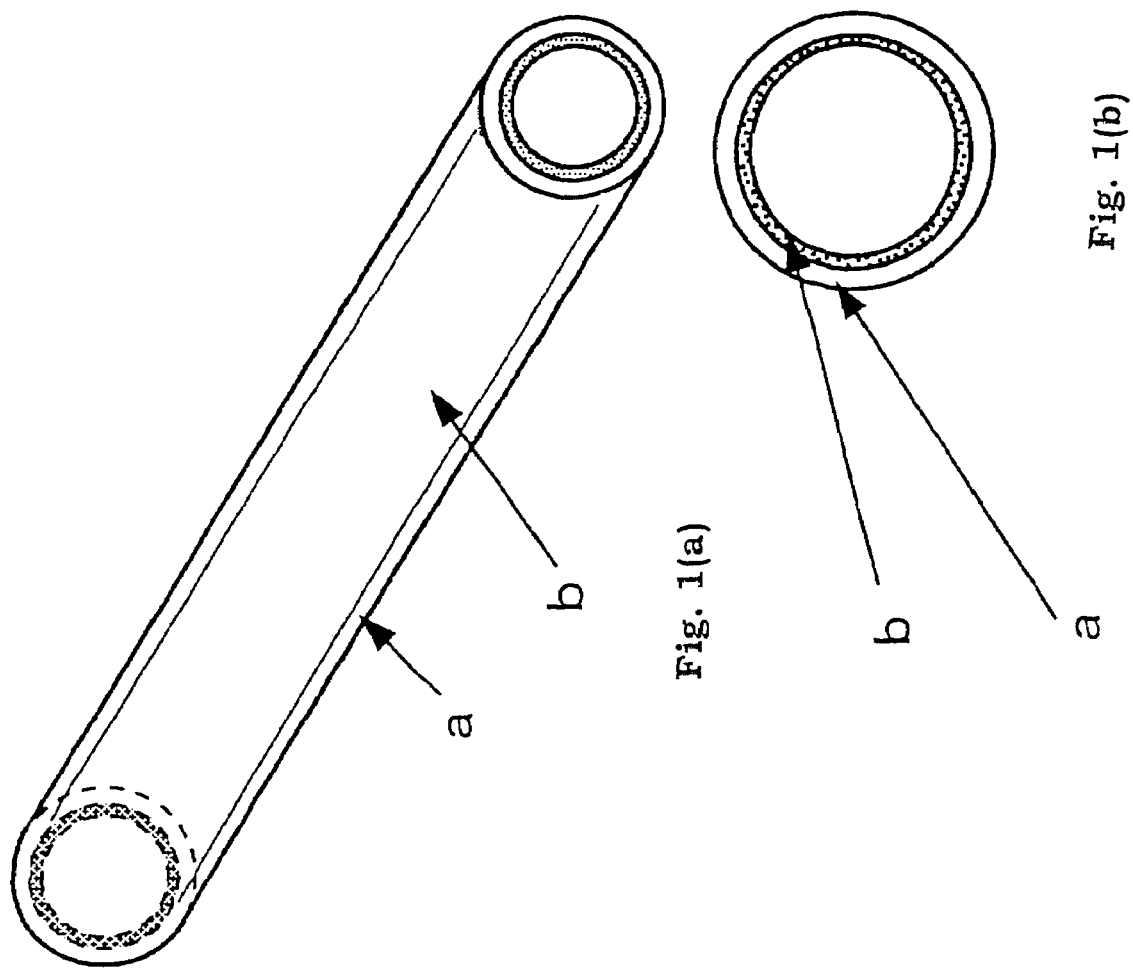

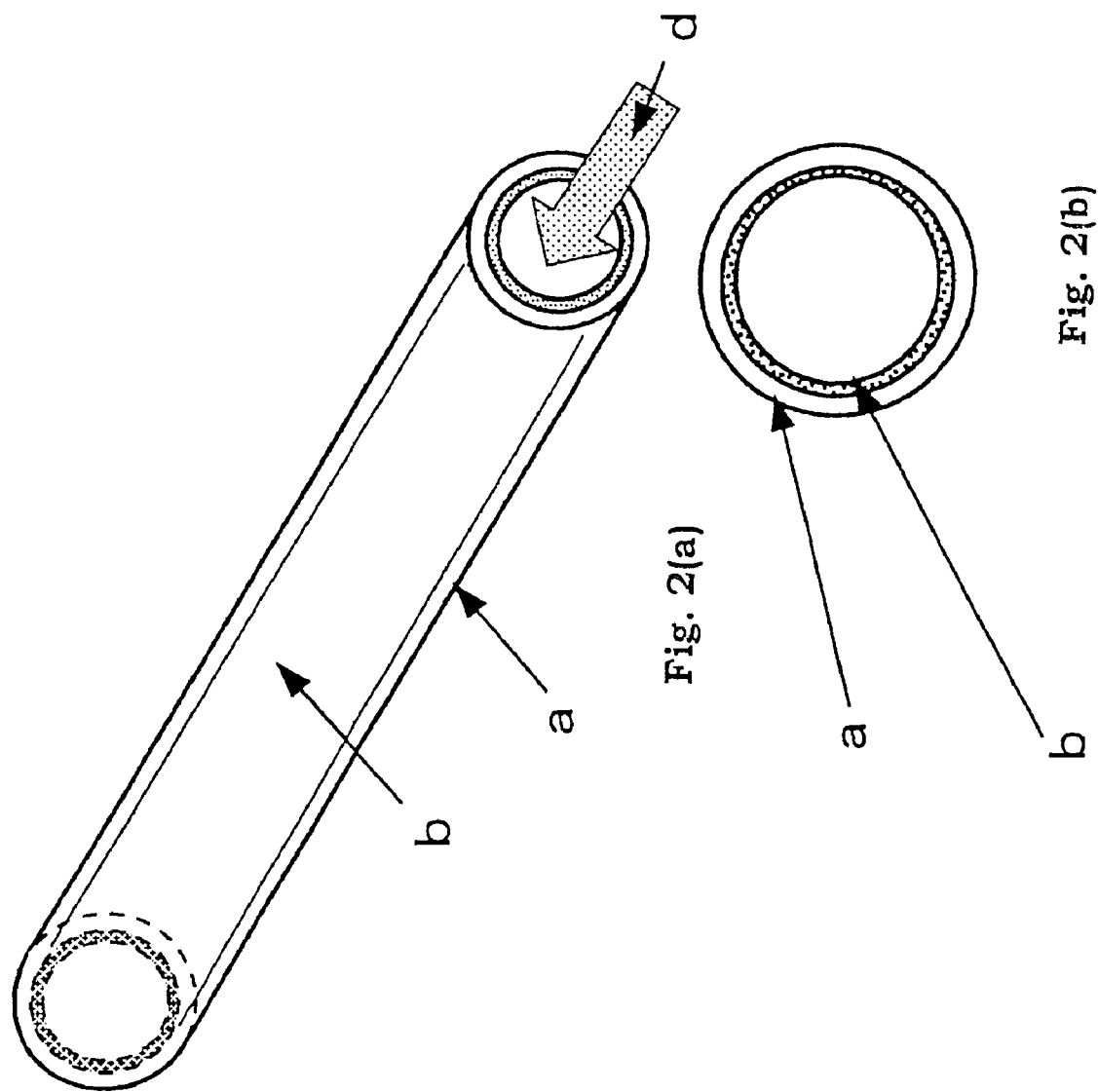
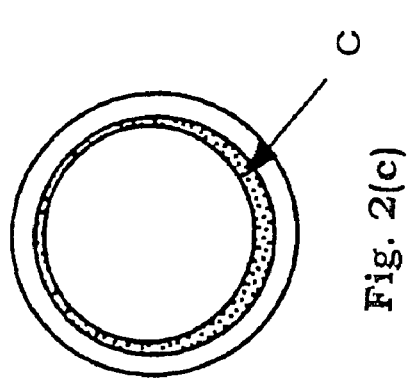
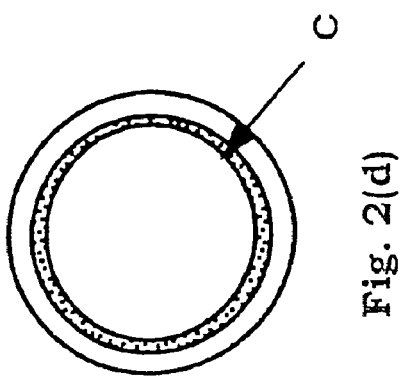
Fig. 2(a)
Fig. 2(b)
Fig. 2(c)
Fig. 2(d)

METHOD FOR FORMING METAL OXIDE FILM AND METHOD FOR FORMING SECONDARY ELECTRON EMISSION FILM IN GAS DISCHARGE TUBE

CROSS-REFERENCE TO RELATED APPLICATION

This application is related to Japanese application No. 2002-238403 filed on Aug. 19, 2002, whose priority is claimed under 35 USC § 119, the disclosure of which is incorporated by reference in its entirety.

BACKGROUND OF THE INVENTION

1. Field of the Invention

The present invention relates to a method for forming a metal oxide film and a method for forming a secondary electron emission film in a gas discharge tube. More specifically, the present invention relates to a method for forming a metal oxide film on an inner wall of a tube.

2. Description of the Related Arts

A variety of methods for forming a metal oxide film on an inner wall of a tube have been conventionally known, and among these, for example, a method which comprises applying a coating solution containing an organic metal compound on the inner wall of the tube to form a coating film, and performing thermal treatment on the coating film, thereby forming the metal oxide film is commonly used.

The metal oxide film formed in the method as described above, however, has a problem that the thickness of the metal oxide film is not uniform. This problem becomes more significant in thin tubes having an inner diameter of not more than 2 mm.

This nonuniform thickness is ascribable to the fact that in performing the thermal treatment on the coating film containing the organic metal compound, when the temperature reaches the melting point of the organic metal compound, the viscosity of the coating film suddenly decreases so that the coating solution applied on the three-dimensional face drops down due to the gravity, making the thickness nonuniform, and this coating film is finally transformed into the metal oxide film. If the thickness of the metal oxide film becomes nonuniform, cracking in the film is induced, and partial variations may occur in characteristics requested for metal oxide film, such as secondary electron emission characteristic and resistance value.

For this reason, it has been desired to provide a method for forming a metal oxide film having a uniform thickness with respect to a three-dimensional surface such as inner wall of a tube, by using an organic metal compound which is to become a metal oxide film as a result of thermal treatment.

SUMMARY OF THE INVENTION

According to the present invention, there is provided a method for forming a metal oxide film comprising, when a metal oxide film is formed by conducting a thermal treatment on a coating film containing an organic metal compound formed on an inner wall of a tube, performing an ultraviolet irradiation treatment or an ozone treatment on the coating film prior to or simultaneously with the thermal treatment.

Furthermore, according to the present invention, there is provided a method for forming a secondary electron emission film of a gas discharge tube comprising, when a secondary electron emission film formed of a metal oxide film is formed by conducting a thermal treatment on a coating film containing an organic metal compound formed on an inner wall of a glass tube, performing an ultraviolet irradiation treatment or an ozone treatment on the coating film prior to or simultaneously with the thermal treatment, wherein the glass tube is an elongated glass tube having an inner diameter of not more than 2 mm.

These and other objects of the present application will become more readily apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

FIGS. 1(a)–(d) are explanatory schematic views of a method for forming a metal oxide film of the present invention;

FIGS. 2(a)–(d) are explanatory schematic views of a method for forming a metal oxide film of the present invention;

DESCRIPTION OF THE PREFERRED EMBODIMENTS

Figures 3A, 3B:
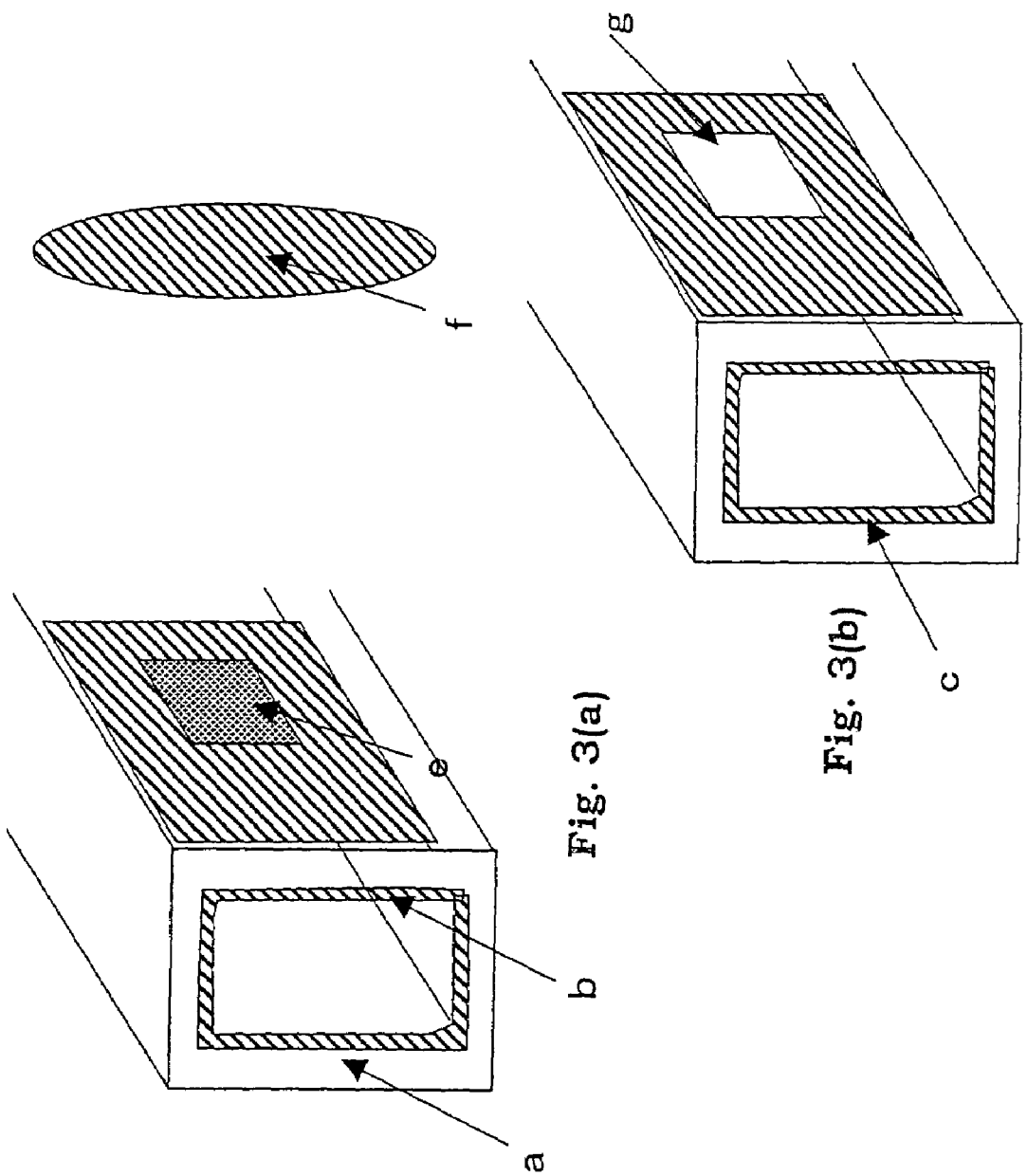
FIGS. 3(a) and (b) are explanatory schematic views of a method for forming a metal oxide film of the present invention.

One feature of the present invention is to promote decomposition of an organic metal compound in a coating film and clustering of a metal oxide by performing an ultraviolet radiation or an ozone treatment on a coating film which is obtainable by applying a coating solution on a three-dimensional face such as inner wall of a tube, the coating solution containing the organic metal compound which is to become a metal oxide film as a result of a thermal treatment.

Owing to this feature, even if the temperature reaches the melting point of the organic metal compound during the subsequent thermal treatment, the organic metal compound having partly decomposed will not reach its melting point so that the viscosity of the coating film is maintained in the area including such a partly decomposed compound. Moreover, in the area where decomposition has further proceeded to make the metal oxide film clustered, still higher viscosity is maintained compared to the former area. In this way, since the viscosity of the coating film will not suddenly decrease even under the temperature of the thermal treatment, it is possible to prevent thermal dropping of the coating film.

Concretely, as shown in perspective views of FIG. 1(a) and FIG. 2(a), and section views of FIG. 1(b) and FIG. 2(b), by performing the ultraviolet radiation and the ozone treatment, as well as the thermal treatment on the coating film "b" formed on the inner wall of the tube "a", the metal oxide film "c" having uniform thickness can be obtained as shown in FIG. 1(d) and FIG. 2(d). In FIG. 2(a), the reference numeral "d" designates an ozone-containing gas. Contrarily, in the case where the ultraviolet radiation or the ozone treatment is not performed, the thickness of the metal oxide film c is nonuniform as shown in FIG. 1(c) and FIG. 2(c).

The present invention will now be described in detail.

In the present invention, first the coating film containing the organic metal compound is formed on the inner wall of the tube.

As the tube, any tubes having a variety of shapes and formed of a variety of materials may be used without any restriction. Concretely, the tube may be oval shape, track shape, polygons such as tetragon and pentagon, indeterminate shapes in section perpendicular to the lateral face of the tube besides circle. In addition, the tube may be a straight tube or a bending tube. As the material for the tube, glass and metals such as aluminum, iron and copper may be used. Furthermore, the present invention is particularly effective when the size (which means a diameter for circular section shape, and a maximum length for other section shapes) of the opening in section perpendicular to the lateral face of the tube is not more than 5 mm. The size of the opening is preferably in the range of 0.5 to 5 mm, and more preferably in the range of 0.5 to 2 mm. The length of the tube is preferably not less than 10 cm, and more preferably in the range of 30 cm to 3 m.

Next, the organic metal compound that can be used in the present invention is not particularly limited insofar as it becomes the metal oxide as a result of thermal treatment and is a compound which is decomposable by the ultraviolet radiation or the ozone treatment. Examples of such organic metal compound include fatty acid salts or alkoxides of metals such as magnesium, aluminum, titanium, tin, calcium, silicon and the like.

As the metal alkoxide, alkoxides composed of lower alcohols such as methanol, ethanol, n-propanol and i-propanol, and metals can be exemplified.

As the fatty acid, aliphatic monocarboxylic acids, or aliphatic polycarboxylic acids such as aliphatic dicarboxylic acids, aliphatic tricarboxylic acids and aliphatic tetracarboxylic acids can be exemplified. In addition, carbon chains constituting fatty acid may be saturated or unsaturated. Furthermore, carbon chains may have a substituent. Although the kind of such substituent is not particularly limited, those likely to be left at the time of decomposition or combustion of the fatty acid are unfavorable.

To be more specific, examples of saturated aliphatic monocarboxylic acid include formic acid, acetic acid, propionic acid, butanoic acid, valeric acid, caproic acid, enanthic acid, caprylic acid, pelargonic acid, capric acid, n-undecylenic acid, lauric acid, n-tridecylenic acid, myristic acid, n-pentadecylenic acid, palmitic acid, margarine acid and stearic acid.

Examples of unsaturaged aliphatic monocarboxylic acid include: olefin monocarboxylic acids such as acrylic acid, butenoic acid, crotonic acid, isocrotonic acid, vinyl acetic acid, methacrylic acid, pentenoic acid, hexenoic acid, heptenoic acid, octenoic acid, decenic acid, undecenic acid, dodeceboic acid, tetradecenic acid, hexadecenoic acid and octadecenoic acid; acetylene monocarboxylic acids such as propiolic acid, tetrolic acid, ethylpropiolic acid, propylpropiolic acid, butylpropiolic acid, amyl propiolic acid, undecinic acid and stearolic acid; diolefin monocarboxylic acids such as pentadienoic acid, diallyl acetic acid, geranic acid and decadiene acid; and polyunsaturated monocarboxylic acids such as octatrienic acid, linolenic acid and oleic acid.

Examples of saturated aliphatic dicarboxylic acid include oxalic acid, malonic acid, succinic acid, glutaric acid, adipic acid, pimelic acid, suberic acid and sebacic acid.

Examples of unsaturated aliphatic dicarboxylic acid include olefin dicarboxylic acids such as butenedioic acid, itaconic acid, citraconic acid, measaconic acid, glutaconate, dihydro muconic acid, and diolefin dicarboxylic acids such as muconic acid.

In the present invention, as the organic metal compound, salts of fatty acid and metal are preferred. This is because, fatty acid salts are easy to decompose or burn upon heating, have high solvent solubility, provide a well-densified film after decomposition or burning, are easy to handle (including safety) and inexpensive, and can easily form salts with various metals. Furthermore, among fatty acids, saturated aliphatic monocarboxylic acids having 2 to 19 carbons are preferably used. Particularly preferred fatty acids are butyric acid, valeric acid, caproic acid, enanthic acid and pelargonic acid.

The coating film containing the organic metal compound can be formed by applying the coating solution containing the organic metal compound on the interior of the tube. The coating solution is composed of at least the organic metal compound and an organic solvent, and a thickening agent may be added for adjusting the viscosity of the application composition to a viscosity which allows excellent operability. The viscosity of the coating solution is preferably in the range of 1 to 100,000 cps, and more preferably in the range of 100 to 1,000 cps. In this specification, the viscosity is a value measured by a spiral viscosimeter.

As the organic solvent, for example, primary alcohols such as methanol, ethanol, 1-propanol, 1-butanol, 1-pentanol, 1-hexanol, 1-heptanol and the like can be recited. These organic solvents may be used alone or in combination.

As the thickening agent, primary alcohols such as ethylene glycol, propylene glycol, butylenes glycol, hexylene glycol, diethylene glycol, dipropylene glycol, dihexylene glycol, ethylene glycol monomethyl ether, ethylene glycol monoethyl ether, ethylene glycol monopropyl ether, ethylene glycol monobutyl ether, propylene glycol monomethyl ether, propylene glycol monoethyl ether, propylene glycol monopropyl ether, propylene glycol monobutyl ether, diethylene glycol monomethyl ether, diethylene glycol monoethyl ether, diethylene glycol monopropyl ether and diethylene glycol monobutyl ether, and propylene glycol monomethyl ether acetate, propylene glycol monoethyl ether acetate, α-terpionol, ethylene glycol dimethyl ether, ethylene glycol diethyl ether, ethyl cellulose and the like can be recited. These thickening agents may be used alone or in combination.

Propylene glycol monomethyl ether acetate, propylene glycol monoethyl ether acetate, α-terpionol, ethylene glycol dimethyl ether and ethylene glycol diethyl ether are useful when the tube is long.

As to the thickness of the coating film, since the thickness of a protective film, a transparent electrode film, a dielectric film or a secondary electron emission film which is finally formed reduces to about 95 to 60% of initial thickness due to a thermal treatment, the thickness of the coating film is preferably determined while taking this reduction in thickness into account. Specifically, the thickness is preferably in the range of 0.5 µm to 10 µm. If the thickness is less than 0.5 µm, it is difficult to obtain the coating film having a uniform thickness, and hence such a thickness is not preferred. On the other hand, if the thickness is more than 10 µm, the coating film is liable to flow due to the gravity during the thermal treatment, making it difficult to obtain the metal oxide film having a uniform thickness, and hence such a thickness is not preferred. To be more specific, as to the protective film, the thickness is preferably in the range of 2

μm to 3 μm though it depends on the protective performance of the metal oxide film which is to be formed. As to the transparent electrode film, the thickness is preferably in the range of 0.5 μm to 1 μm though it depends on the conductivity of the metal oxide film which is to be formed. As to the dielectric film, the thickness is preferably in the range of 2 μm to 5 μm though it depends on the dielectric characteristic of the metal oxide film which is to be formed. As to the secondary electron emission film, the thickness is preferably in the range of 0.1 μm to 1 μm though it depends of the secondary discharge characteristic of the metal oxide film which is to be formed.

Any known methods may be used as a method of forming the coating film without particular restriction. For example, the coating film may be formed by making the coating solution pass through the tube which is vertically held so that its open ends are positioned along the up and down direction. Alternatively, the coating film may be formed by injecting the coating solution at either one open end of the tube, and conducting spin coating around this open end. The coating operation may be conducted while the tube is heated or the internal pressure of the tube is reduced as necessary.

According to the present invention, in forming the metal oxide film by heating the coating film, the coating film is subjected to the ultraviolet radiation treatment or the ozone treatment prior to or simultaneously with the thermal treatment. In the ultraviolet treatment, the coating film is irradiated with an ultraviolet ray which is emitted outside the tube and passed through the tube wall. Examples of ultraviolet ray for use in the ultraviolet treatment include, but not particularly limited to, I line and G line of mercury lamp and ultraviolet rays having a wavelength of not more than 300 nm (for example 254 nm). The irradiation condition is preferably 20 minutes or longer and more preferably in the range of 20 to 30 minutes for I and G lines of mercury lamp. In the case of ultraviolet rays having a wavelength of not more than 300 nm (254 nm, for example), irradiation time is preferably 10 minutes or longer and more preferably in the range of 10 to 20 minutes. The atmosphere for irradiation may be, but not particularly limited to, under an atmospheric pressure in the case of I and G lines of mercury lamp, and preferably under nitrogen or rare gas atmosphere in the case of ultraviolet rays having a wavelength of not more than 300 nm (254 nm, for example).

In addition, the ultraviolet irradiation treatment as described above may be executed via a mask of a predetermined pattern, and thereby the metal oxide film of the predetermined pattern may be formed. Specifically, as shown in FIGS. 3(a) and 3(b), after forming the coating film "b" on the inner wall of the tube "a", the mask "e" is formed at a predetermined position, and then irradiation with ultraviolet from an optical source "f" via the mask "e" is effected followed by thermal treatment, whereby the metal oxide film "c" having a predetermined pattern can be obtained. In FIG. 3(b), the reference numeral "g" designates an area where the metal oxide film is not formed.

Next, the ozone treatment is conducted by exposing the coating film to at least ozone. Specifically, exposure to a gas containing 1 to 5% by volume of ozone (such as atmospheric air, nitrogen, rare gas and the like, but not limited thereto) is exemplified. The treatment time is preferably 10 minutes or longer, and more preferably in the range of 10 to 20 minutes. It is also preferred that the ozone is blown into the tube sufficiently.

Also, the coating film may be subjected to a drying process prior to the above-mentioned thermal treatment in order to remove the organic solvent contained in the coating solution. Although the condition for the drying process differs depending on the composition of the coating solution and the diameter and the length of the tube, it is preferred to perform the drying process at a temperature of 60 to 110° C. for 10 to 20 minutes. Furthermore, the drying process is preferably conducted in a flowing atmosphere (such as atmospheric air) in order to efficiently remove the organic solvent. Furthermore, the drying process may be conducted under reduced pressures or elevated pressures as necessary.

Figure 4:
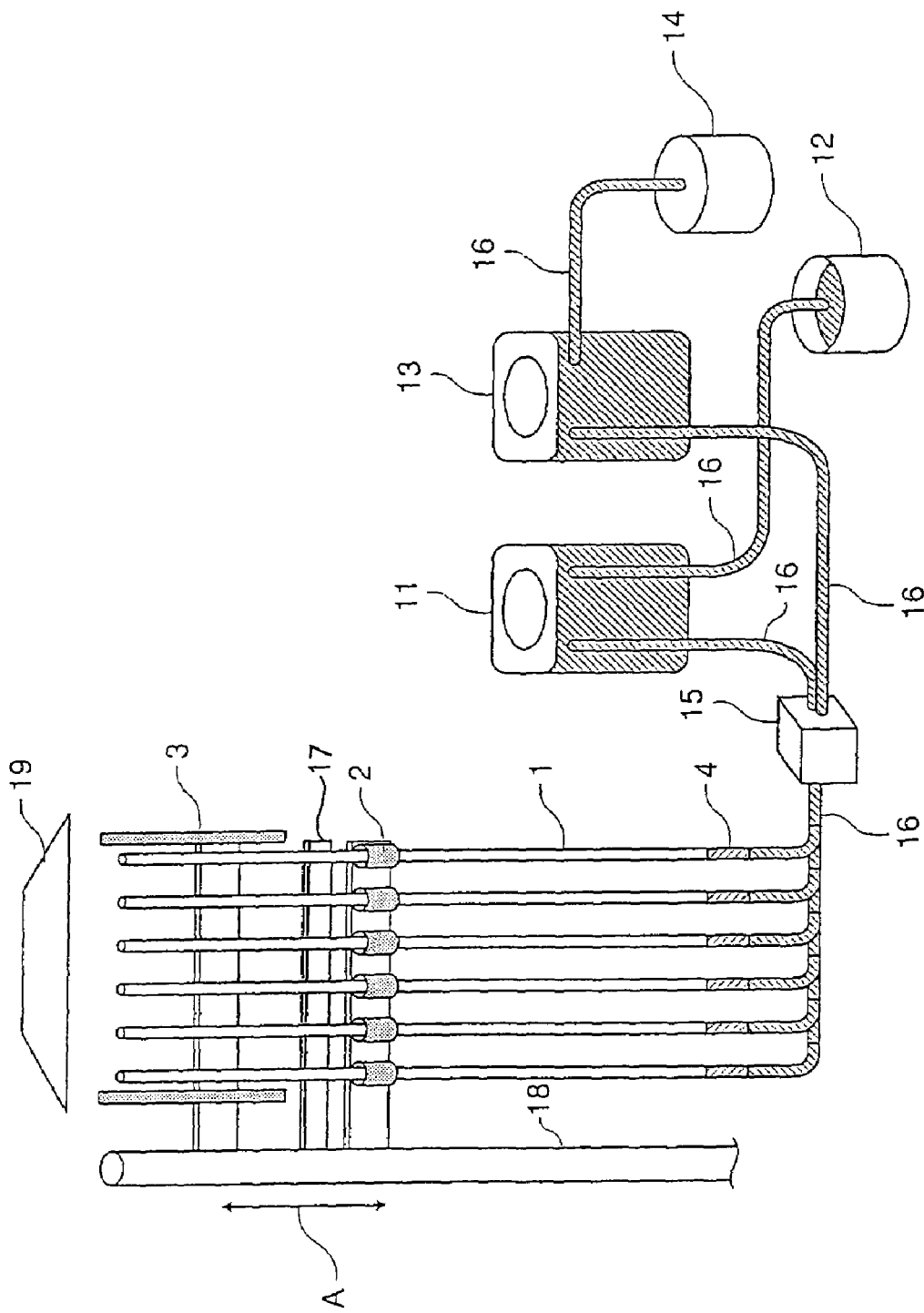
FIG. 4 is an explanatory schematic view of an apparatus using in a method for forming a metal oxide film of the present invention.

For forming the coating film and drying the coating film, an apparatus as illustrated in FIG. 4 can be used. In this view, the reference numeral 1 denotes a tube, the reference numeral 2 denotes a first heater, the reference numeral 3 denotes a second heater, the reference numeral 4 denotes a coating solution, the reference numeral 11 denotes a liquid delivery/recovery pump, the reference numeral 12 denotes an accommodator of coating solution, the reference numeral 13 denotes a waste liquid pump, the reference numeral 14 denotes a waste liquid accommodator, the reference numeral 15 denotes an electromagnetic valve, the reference numeral 16 denotes a liquid delivery hose, the reference numeral 17 denotes ultraviolet irradiation means, the reference numeral 18 denotes a power slider, and the reference numeral 19 denotes an exhauster.

In this coating film forming apparatus, coating films are formed simultaneously on inner surfaces of a plurality of tubes 1. The plurality of tubes 1 are vertically held by means of a holder (not shown).

The power slider 18 is movable in the direction denoted by an arrow A in the view. The first heater 2, the second heater 3 and the ultraviolet irradiation means 17 are attached to the power slider 18 so that they move in the direction denoted by the arrow A as the power slider 18 moves. The first heater 2 is long enough to partly cover the tube 1, and the second heater 3 is long enough to fully cover the tube 1 in the longitudinal direction.

The liquid delivery/recovery pump 11 draws the coating solution 4 from the coating solution accommodator 12 and delivers it into the tube 1, and after applying the coating solution 4 on the inner surface of the tube 1, draws and recovers the coating solution 4 to accommodate it again in the coating solution accommodator 12.

The waste liquid pump 13 draws the coating solution 4 in a liquid pool generated during formation of the coating film on the inner surface of the tube 1 and discharges it to the waste liquid accommodator 14.

The electromagnetic valve 15 switches between the liquid delivery/recovery pump 11 and the waste liquid pump 13.

The exhauster 19 is provided for exhausting a solvent which is a volatile component discharged from the upper tube opening of the tube 1 during the drying process of the coating solution 4.

Now, explanation will be made on the operation of this coating film forming apparatus.

First, the coating solution 4 is applied on the inner surface of the tube 1. This is executed by drawing the coating solution 4 from the coating solution accommodator 12 by means of the liquid delivery/recovery pump 11, delivering the coating solution 4 into the tube 1 from below the tube 1, and again accommodating the coating solution 4 into the coating solution accommodator 12 by drawing it from below the tube 1. And then switching to the electromagnetic valve 15 is effected.

Then the power slider 18 is caused to move upward (or may be moved in advance), and the first heater 2, the second heater 3 and the ultraviolet irradiation means 17 are positioned at upper levels of the tube 1. The first heater 2 and the second heater 3 are then energized to heat and dry the coating solution at upper levels of the tube 1 by means of the first heater 2. At this time, since a liquid pool generates in the interior of the tube at the level lower than the first heater 2, the liquid pool is drawn by the waste liquid pump 13 to be exhausted into the waste liquid accommodator 14.

Meanwhile, the power slider 18 is lowered small by small so that a new liquid pool constantly generates at a level lower than the first heater 2, and by sequentially repeating this operation, the first heater 2 and the second heater 3 are moved to below the tube 1. In this manner, a dried coating film having a uniform thickness is formed on the entire inner surface of the tube 1.

In this manner, by making the through hole in the tube to be closed by the coating solution having reduced viscosity, or namely by forming a liquid pool when the coating solution in the tube is sequentially dried by heating the tube from the upper part to the lower part, physical force of the coating solution is well balanced and uniform in the circumferential direction, so that the film thickness of the coating film can be made uniform.

Furthermore, the coating film is irradiated with the ultraviolet ray by means of the ultraviolet irradiation means 17 for promoting decomposition of the organic metal compound in the coating film and clustering of the metal oxide. Herein the second heater 3 serves to prevent the solvent volatilizing during this drying process from adhering to the dried coating film. The coating film formed in this manner is subjected to thermal treatment in a baking apparatus to become the metal oxide film.

In the ultraviolet irradiation process shown in FIG. 4, formation of coating film and drying process are carried out in series, however, they are not necessarily carried out in series. For example, the ultraviolet irradiation process may be conducted simultaneously with the thermal treatment in the baking process of the coating film.

The thermal treatment which is conducted after or simultaneously with the above ultraviolet irradiation process or ozone process is preferably conducted in an oxygen-containing atmosphere at a temperature in the range of 300 to 500° C. for 30 minutes to 2 hours, though the above condition depends on the type of the organic metal compound. To be more specific, the thermal treatment may be conducted at a temperature of 410 to 470° C. when magnesium caproate is used, and at a temperature of 300 to 400° C. when titanium caproate is used as the organic metal compound. Herein the oxygen-containing atmosphere is an atmosphere which contains at least oxygen, and the concentration of the oxygen is preferably in the range of the atmospheric air composition to 100% by volume. Additionally, in order to improve the conversion efficiency to the metal oxide film, the thermal treatment is preferably executed in a fluid atmosphere. Furthermore, the thermal treatment may be executed under reduced pressures or elevated pressures as necessary.

Next, the case where the metal oxide film obtained in the manner as described above is used as a secondary electron emission film of a display device using a gas discharge tube will be explained.

Figure 5:
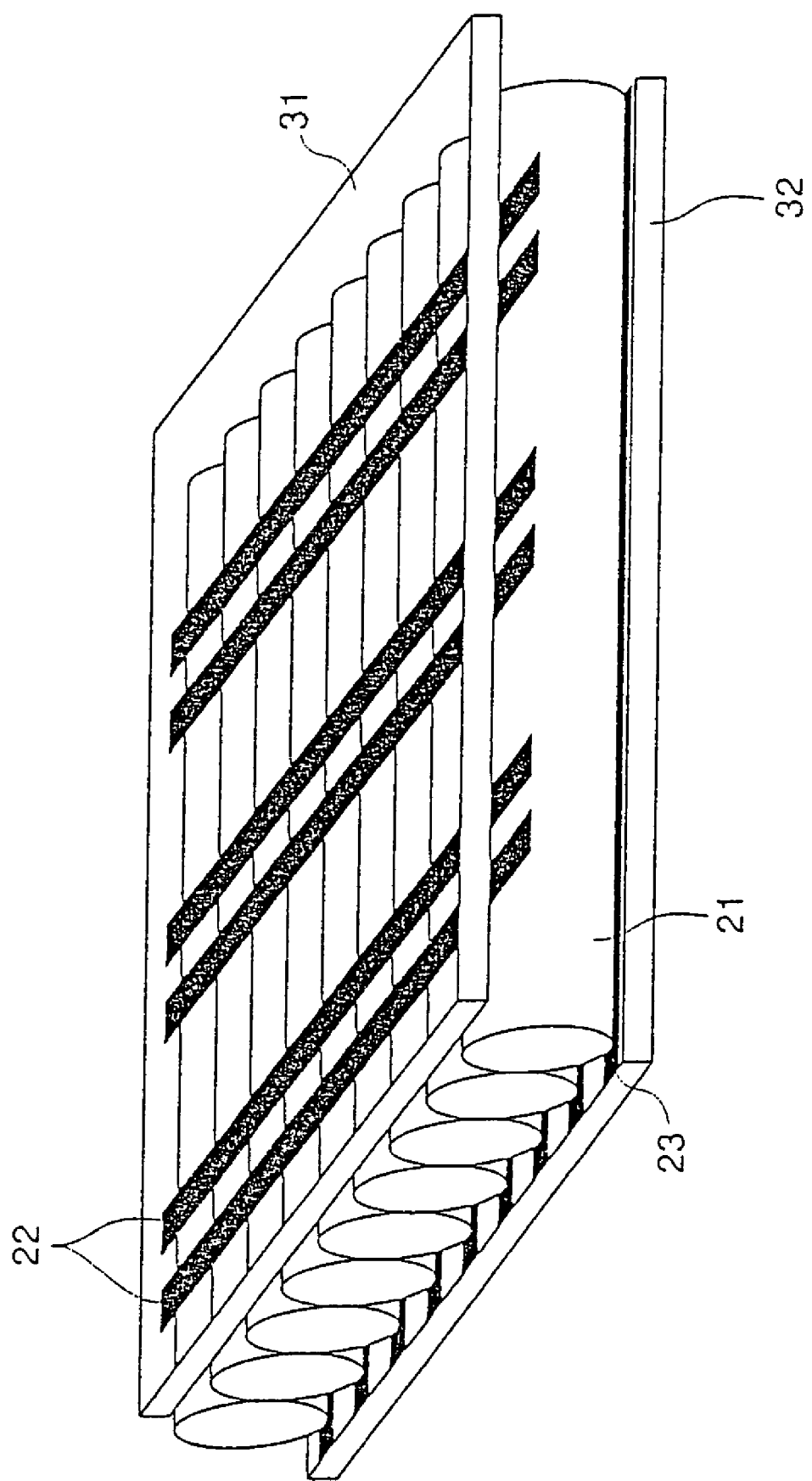
FIG. 5 is an explanatory view showing one example of a display device using a gas discharge tube having a secondary electron emission film formed on the inner surface in the manner of the present invention.

FIG. 5 is an explanatory view showing one example of a display device using a gas discharge tube having a secondary electron emission film formed on the inner surface in the manner of the present invention as described above.

In this view, the reference numeral 31 denotes a front side substrate, the reference numeral 32 denotes a back side substrate, the reference numeral 21 denotes a gas discharge tube, the reference numeral 22 denotes a display electrode couple (main electrode couple), and the reference numeral 23 denotes a signal electrode (also referred to as data electrode).

The interior (discharge space) of the slender gas discharge tube 21 provided with a secondary electron emission film and a fluorescent layer is filled with a discharge gas and sealed at both ends. The signal electrode 23 is formed on the back side substrate 32 and disposed along the longitudinal direction of the gas discharge tube 21. The display electrode couple 22 is formed on the front side substrate 31 and disposed in the direction intersecting with the signal electrode 23.

The signal electrode 23 and the display electrode couple 22 are provided so that they are respectively brought into close contact with the lower outer periphery and the upper outer periphery of the gas discharge tube 21 when assembled. In this case, in order to ensure the close contact, the display electrode and the gas discharge tube surface may be adhered with a conductive adhesive interposed therebetween.

When the display device is viewed two-dimensionally, an intersecting portion between the signal electrode 23 and the display electrode couple 22 constitute a unit light emitting area. For achieving display, either one line of the display electrode couple 22 is used as a scanning electrode. Selective discharge is caused to generate at the intersection of this scanning electrode and the signal electrode 23 to select a light emitting area, and using a wall charge generated in the area of the inner surface of the tube in association with the light emission, display discharge is generated by the display electrode couple 22. The selective discharge is facing discharge generated in the gas discharge tube 21 between the vertically facing scanning electrode and the signal electrode 23, and the display discharge is surface discharge generated in the gas discharge tube 21 between two display electrodes that are arranged in parallel with each other on a plane.

In the illustrated electrode structure, three electrodes are arranged for each one light emitting portion, and display discharge is generated by the display electrode couple. However, the structure is not limited to this, but such a structure that display discharge is generated between the display electrode couple 22 and the signal electrode 23 is also available.

That is, the electrode structure may be of the type that the display electrode couple 22 is implemented by one display electrode, and selective discharge and display discharge (facing discharge) are caused to generate between this display electrode serving as the scanning electrode and the signal electrode 23.

EXAMPLES

The present invention will be further described by way of examples of forming a secondary electron emission film on the inner wall of a gas discharge tube, however, it is to be understood that the present invention is not limited to the examples.

Example 1

A coating solution comprising 1 part by weight of magnesium caproate, 1 part by weight of ethanol and 1 part by weight of propylene glycol monomethyl ether acetate (viscosity: 20 to 30 cps) was applied on the inner wall of a glass slender tube having an inner diameter of 0.8 mm and a length of 250 mm forming a tubular container of a gas discharge tube and the coating solution was dried, thereby forming a coating film. Specifically, the coating process was executed by introducing the coating solution into the end part of the slender tube, and disposing the slender tube in the spinner, and performing spin coating around the end part. Drying process was executed by heating for 15 minutes at 70° C. The thickness of the coating film was about 25,000 Å.

Next, both the front and back surfaces of the slender tube on which coating film was formed was irradiated with an ultraviolet ray having a wavelength of 254 nm from the low pressure mercury lamp for 10 minutes. After irradiation, a thermal treatment at a temperature of not more than 450° C. was executed for 30 minutes, to thereby obtain a magnesium oxide film.

The thickness of the magnesium oxide film thus obtained was 3,000 Å at the thinnest point and 4,500 Å at the thickest point. To the contrary, in the case where the ultraviolet irradiation was not executed, the thickness of the obtained magnesium oxide film was 1,000 Å at the thinnest point and 8,000 Å at the thickest point. Therefore, it was confirmed that the thickness of the magnesium oxide film could be made uniform by the ultraviolet irradiation.

Example 2

A coating solution comprising 1 part by weight of magnesium caproate, 0.5 part by weight of ethanol and 0.4 part by weight of diethylene glycol monopropyl ether acetate (viscosity: 350 to 400 cps) was applied on the inner wall of a glass tube having an inner diameter of 0.8 mm and a length of 1,000 mm and the coating solution was dried, thereby forming a coating film. Specifically, the coating process was executed by introducing the coating solution into a lower opening of a slender tube which is held upright so that the interior of the slender tube is filled with the coating solution, and then slowly discharging the coating solution. Drying process was executed in discharging the coating solution, by means of a local heater which scans the coating solution adhering on the tube wall in the vicinity of the top face of the coating solution filling the slender tube, in accordance with the movement of the top face of the coating solution filling the slender tube. The thickness of the coating film was about 20,000 Å.

Next, both the front and back surfaces of the slender tube on which coating film was formed was irradiated with mixed ultraviolet rays of G ray and I ray from the very high pressure mercury lamp for 20 minutes. After irradiation, a thermal treatment at a temperature of not more than 450° C. was executed for 30 minutes, to thereby obtain a magnesium oxide film.

The thickness of the magnesium oxide film thus obtained was 3,000 Å at the thinnest point and 4,500 Å at the thickest point. To the contrary, in the case where the ultraviolet irradiation was not executed, the thickness of the obtained magnesium oxide film was 1,000 Å at the thinnest point and 8,000 Å at the thickest point. Therefore, it was confirmed that the thickness of the magnesium oxide film could be made uniform by the ultraviolet irradiation.

According to the present invention, it is possible to provide a method for forming the metal oxide film having a uniform thickness with respect to the three-dimensional surface such as inner wall of the tube, using the organic metal compound which is to become the metal oxide film as a result of thermal treatment.

What is claimed is:

1. A method for forming a metal oxide film comprising the steps of:
    forming a metal oxide film by conducting a thermal treatment on a coating film containing an organic metal compound formed on an inner wall of a tube, and performing
        an ultraviolet irradiation treatment or
        an ozone treatment
    on the coating film prior to or simultaneously with the thermal treatment;
    wherein the tube has an opening and a length, and wherein the size of the opening is not more than 2 mm and the length is not less than 30 cm.

2. The method for forming a metal oxide film of claim 1, wherein the ultraviolet irradiation treatment or the ozone treatment is performed prior to the thermal treatment and simultaneously with a drying process of the coating film.

3. The method for forming a metal oxide film of claim 1, wherein the step of performing an ultraviolet irradiation treatment further comprises the step of forming a mask of a predetermined pattern on the coating film.

4. The method for forming a metal oxide film of claim 1, wherein the tube has the size of the opening in the range of 0.5 to 2 mm and the length in the range of 30 cm to 3 m.

5. A method for forming a secondary electron emission film of a gas discharge tube comprising the steps of:
    forming a secondary electron emission film formed of a metal oxide film by conducting a thermal treatment on a coating film containing an organic metal compound formed on an inner wall of a glass tube, and performing
        an ultraviolet irradiation treatment or
        an ozone treatment on the coating film prior to or simultaneously with the thermal treatment,
    wherein the glass tube is an elongated glass tube having an inner diameter of not more than 2 mm and having a length of not less than 30 cm.

* * * * *